(12) United States Patent
Herberholz et al.

(10) Patent No.: US 11,720,683 B2
(45) Date of Patent: Aug. 8, 2023

(54) SECURE BOOT PROCESS FOR A COMPUTER SYSTEM

(71) Applicant: Arm Limited, Cambridge (GB)

(72) Inventors: Rainer Herberholz, Great Abington (GB); Alexander Klimov, Hadera (IL); Peter Andrew Rees Williams, Great Abington (GB)

(73) Assignee: Arm Limited, Cambridge (GB)

( * ) Notice: Subject to any disclaimer, the term of this patent is extended or adjusted under 35 U.S.C. 154(b) by 321 days.

(21) Appl. No.: 17/192,278

(22) Filed: Mar. 4, 2021

(65) Prior Publication Data

US 2022/0284104 A1    Sep. 8, 2022

(51) Int. Cl.
*G06F 21/57* (2013.01)
*G06F 8/65* (2018.01)
*H04L 9/32* (2006.01)

(52) U.S. Cl.
CPC .............. *G06F 21/575* (2013.01); *G06F 8/65* (2013.01); *G06F 21/572* (2013.01); *H04L 9/3236* (2013.01); *G06F 2221/033* (2013.01)

(58) Field of Classification Search
CPC ................. G06F 21/572; G06F 21/575; G06F 2221/033; G06F 8/65; H04L 9/3236; H04L 9/3247
See application file for complete search history.

(56) References Cited

U.S. PATENT DOCUMENTS

| | | | | |
|---|---|---|---|---|
| 2012/0210115 | A1* | 8/2012 | Park | H04L 9/3247 713/2 |
| 2015/0074384 | A1* | 3/2015 | Yajima | G06F 21/575 713/2 |
| 2019/0319796 | A1* | 10/2019 | Ghosh | H04L 9/3239 |

* cited by examiner

*Primary Examiner* — Terrell S Johnson
(74) *Attorney, Agent, or Firm* — Leveque Intellectual Property Law, P.C.

(57) ABSTRACT

Embodiments of the present disclosure advantageously provide a secure boot integrity verification system that is protected against future quantum attacks without relying on correctly functioning hardware security modules (HSMs) for the expected lifetime of the computer system or embedded device.

20 Claims, 3 Drawing Sheets

SECURE BOOT PROCESS FOR A COMPUTER SYSTEM

BACKGROUND

The present disclosure relates to computer systems. More particularly, the present disclosure relates to a secure boot process for a computer system.

Generally, boot and bootstrap are terms that describe the process for starting a computer system from a powered-down state (i.e., a cold boot), as well as the process for restarting a computer system (i.e., a warm boot), such as, for example, after a fatal malfunction occurs during operation. Because an attacker may try to load non-authorized code during the boot, a "secure boot" process may be performed to ensure that only authorized code is executed by the computer system.

In a simple example of a secure boot process, an immutable boot program is initially loaded from read-only memory (ROM) and executed by a boot processor, which may also be the central processing unit (CPU) of the computer system. The immutable boot program reads an image of the next program to be loaded from non-volatile memory, verifies the integrity of the image, and, if the verification is successful, instructs the processor or CPU to execute the next program. The immutable boot program is typically stored in a special area of memory known as "boot ROM."

Various cryptographic means may be used for to verify the integrity of the next program to be executed, such as, for example, a digital signature, a message authentication code (MAC) or tag, etc., but the set of possible verification algorithms is usually fixed during the manufacturing and lifetime of the computer system or device. While computer systems or devices protected by secure boot processes are expected to serve for decades, unfortunately, it is not known what type of verification algorithm will be safe from attacks by quantum computing systems in the future.

DETAILED DESCRIPTION

Figure 1:
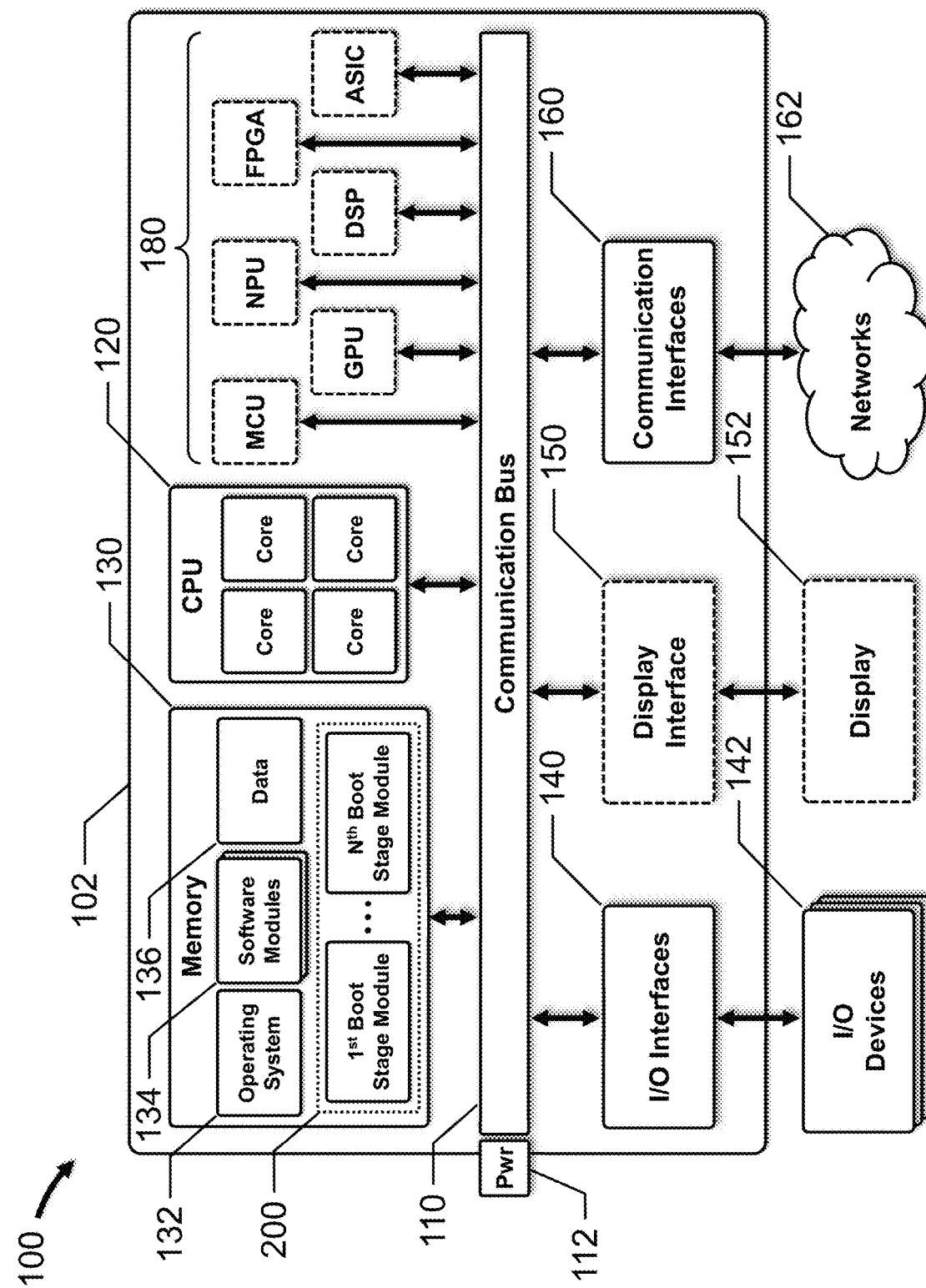
FIG. 1 depicts a block diagram of a computer system, in accordance with embodiments of the present disclosure.

Embodiments of the present disclosure will now be described with reference to the drawing figures, in which like reference numerals refer to like parts throughout.

Embodiments of the present disclosure advantageously provide a secure boot integrity verification system that is protected against future quantum attacks without relying on correctly functioning hardware security modules (HSMs) for the expected lifetime of the computer system or embedded device.

In one embodiment, a method of assuring integrity of code loaded during a boot process of a computer system includes reading an image of a first boot stage module of a multi-stage secure boot integrity verification system from a first memory; executing the first boot stage module; reading an image of a first version of a second boot stage module of the multi-stage secure boot integrity verification system from a second memory, the first version of the second boot stage module including a stateful hash-based signature (HBS); authenticating, by the first boot stage module, the first version of the second boot stage module based on a quantum-safe process, including verifying the stateful HBS within the image of the first version of the second boot stage module; executing the first version of the second boot stage module when the stateful HBS is verified; reading an image of an additional boot stage module from a third memory; authenticating, by the first version of the second boot stage module, the image of the additional boot stage module; and executing the additional boot stage module when the image of the additional boot stage module is authenticated. Prior to a subsequent secure booting of the computer system, the first version of the second boot stage module is replaced with a second version of the second boot stage module that is configured to authenticate the image of the additional boot stage module based on a quantum-safe process, and, during the subsequent secure booting of the computer system, the second version of the second boot stage module is authenticated by the first boot stage module, and then executed in place of the first version of the second boot stage module.

FIG. 1 depicts a block diagram of computer system 100, in accordance with embodiments of the present disclosure.

Computer system 100 includes computer 102, I/O devices 142 and display 152. Computer 102 includes communication bus 110 coupled to one or more processors 120, memory 130, I/O interfaces 140, display interface 150, one or more communication interfaces 160. In certain embodiments, computer 102 may include one or more hardware accelerators (HAs) 180. Generally, I/O interfaces 140 are coupled to I/O devices 142 using a wired or wireless connection, display interface 150 is coupled to display 152, and communication interface 160 is connected to network 162 using a wired or wireless connection. In some embodiments, certain components of computer 102 are implemented as a system-on-chip (SoC); in other embodiments, computer 102 may be hosted on a traditional printed circuit board, motherboard, etc.

In some embodiments, computer system 100 is an embedded system in which one or more of the components depicted in FIG. 1 are not present, such as, for example, I/O interfaces 140, I/O devices 142, display interface 150, display 152, etc. Additionally, certain components, when present, may be optimized based on various design constraints, such as, for example, power, area, etc., such as, for example, HA 180.

Communication bus 110 is a communication system that transfers data between processor 120, memory 130, I/O interfaces 140, display interface 150, communication interface 160, etc., as well as other components not depicted in FIG. 1. Power connector 112 is coupled to a power supply (not shown). In some embodiments, communication bus 110 is a network-on-chip (NoC).

Processor 120 includes one or more general-purpose or application-specific microprocessors that executes instructions to perform control, computation, input/output, etc. functions for computer system 100. Processor 120 may include a single integrated circuit, such as a micro-processing device, or multiple integrated circuit devices and/or circuit boards working in cooperation to accomplish the functions of processor 120. Additionally, processor 120 may include multiple processing cores, as depicted in FIG. 1. Generally, computer system 100 may include one or more processors 120, each containing one or more processing cores as well as various other modules, which may execute computer programs or modules, such as operating system 132, software modules 134, etc., stored within memory 130.

In some embodiments, computer system 100 may include two (2) processors 120, each containing multiple processing cores. For example, one processor 120 may be a high-performance processor containing four (4) "big" processing cores, e.g., Arm Cortex A73, Cortex A75, Cortex A76, etc., while the other processor 120 may be a high efficiency processor containing four (4) "little" processing cores, e.g., Arm Cortex 53, Arm Cortex 55, etc. In this example, the "big" processing cores include a memory management unit (MMU). In other embodiments, computer system 100 may be an embedded system that includes a single processor 120 with one or more processing cores, such as, for example, an Arm Cortex-M core.

Generally, storage element or memory 130 stores instructions for execution by processor 120 and data. Memory 130 may include a variety of non-transitory computer-readable medium that may be accessed by processor 120. In various embodiments, memory 130 may include volatile and non-volatile medium, non-removable medium and/or removable medium. For example, memory 130 may include any combination of volatile and non-volatile memory (NVM), such as random access memory (RAM), DRAM, SRAM, read-only memory (ROM), flash memory, cache memory, and/or any other type of or non-transitory computer-readable medium.

Memory 130 contains various components for retrieving, presenting, modifying, and storing data. For example, memory 130 stores software modules that provide functionality when executed by processor 120. The software modules include operating system 132 that provides operating system functionality for computer system 100. Software modules 134 provide various functionality, as is well known. Data 136 may include data associated with operating system 132, software modules 134, etc.

Additionally, memory 130 stores multi-stage secure boot integrity verification system 200, which includes a number (N) of boot stage modules that are executed by processor 120 to boot and reboot computer system 100, as described in more detail below.

I/O interfaces 140 are configured to transmit and/or receive data from I/O devices 142. I/O interfaces 140 enable connectivity between processor 120 and I/O devices 142 by encoding data to be sent from processor 120 to I/O devices 142, and decoding data received from I/O devices 142 for processor 120. Generally, data may be sent over wired and/or wireless connections. For example, I/O interfaces 140 may include one or more wired communications interfaces, such as USB, Ethernet, etc., and/or one or more wireless communications interfaces, coupled to one or more antennas, such as WiFi, Bluetooth, cellular, etc.

Generally, I/O devices 142 provide input to computer system 100 and/or output from computer system 100. As discussed above, I/O devices 142 are operably connected to computer system 100 using a wired and/or wireless connection. I/O devices 142 may include a local processor coupled to a communication interface that is configured to communicate with computer system 100 using the wired and/or wireless connection. For example, I/O devices 142 may include a keyboard, mouse, touch pad, joystick, etc., sensors, actuators, etc.

Display interface 150 is configured to transmit image data from computer system 100 to monitor or display 152.

Communication interface 160 is configured to transmit data to and from network 162 using one or more wired and/or wireless connections. Network 162 may include one or more local area networks, wide area networks, the Internet, etc., which may execute various network protocols, such as, for example, wired and/or wireless Ethernet, Bluetooth, etc. Network 162 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

In certain embodiments, HAs 180 may be configured to execute, inter alia, machine learning applications, such as, for example, artificial neural networks (ANNs), decision trees, Bayesian networks, etc., in support of various applications embodied by software modules 134. Generally, HAs 180 include one or more processors, coprocessors, processing engines (PEs), compute engines (CEs), etc., such as, for example, CPUs, GPUs, NPUs (e.g., the Arm ML Processor), DSPs, field programmable gate arrays (FPGAs), application specific integrated circuits (ASICs), controllers, microcontrollers, matrix multiplier circuits, etc. HAs 180 also include a communication bus interface as well as non-volatile and/or volatile memories, such as, for example, ROM, flash memory, SRAM, DRAM, etc. In many embodiments of computer system 100, HAs 180 are not present.

Computer system 100 may be an embedded system or device that does not include certain elements depicted in FIG. 1, and may include other elements not depicted in FIG. 1. Generally, an embedded system includes communication bus 110, power connector 112 and a power supply (not shown), one or more processors, controllers or microcontrollers 120, memory 130, and communications interface 160. For example, display interface 150, display 152 and HAs 180 may not be included in an embedded system (as suggested by the dotted outline). Many embedded systems may also include one or more I/O interfaces 140, as well as sensor and/or actuator devices 142. As discussed above, memory 130 stores software modules that provide functionality when executed by processor 120, such as operating system 132, which may be a real-time operating system, software modules 134, data 136, multi-stage secure boot integrity verification system 200, etc.

For example, an automobile engine control computer, also known as an engine control unit (ECU) or engine control module (ECM), is an embedded device that includes processor 120, memory 130 to store programming instructions and related data, one or more I/O interfaces 140, sensor devices 142, actuator devices 142, and communications interface 160. Processor 120 executes the instructions stored in memory 130 to read and process data from sensors 142 (e.g., air flow, pressure, temperature, speed, exhaust oxygen sensors), generate and transmit commands to actuators 142 (e.g., programmable throttle stop actuator, electronic valve actuators, etc.), receive commands and transmit responses to other computer systems, control units or control modules via communications interface 160, etc.

As the name suggests, quantum computing systems employ quantum effects, such as, for example, quantum superposition, quantum entanglement, etc., to perform mathematical calculations much faster than traditional computer systems. One of these calculations is integer factorization, the possibility of which compromises security of the Rivest-Shamir-Adleman (RSA) digital signature scheme. While some digital signature verification schemes may be safe against quantum attacks by quantum computing systems, these algorithms are typically cumbersome to use due to their reliance on hardware security modules (HSMs).

An HSM is a computing device, such as, for example, a plug-in HSM card, an external HSM device, etc., that includes secure memory to store secret keys, and one or more secure crypto-processors to protect and manage the secret keys, and perform cryptographic functions, such as encryption, decryption, etc.

Manufacturers typically use HSMs to generate secret keys that are used by a secure boot process of certain computer systems and embedded devices. Unfortunately, HSMs that implement quantum-safe stateful hash-based signature (HBS) schemes do not allow the secret keys to be exported, even in encrypted form, which requires that at least some of the HSMs function correctly throughout the expected lifetime of the computer system or embedded device, which may be 20 years or more for embedded devices provided in products such as automobiles. This situation presents a significant risk to manufacturers.

Embodiments of the present disclosure advantageously provide a secure boot integrity verification system that is protected against future quantum attacks without relying on correctly functioning HSMs for the expected lifetime of the computer system or embedded device.

Figure 2:
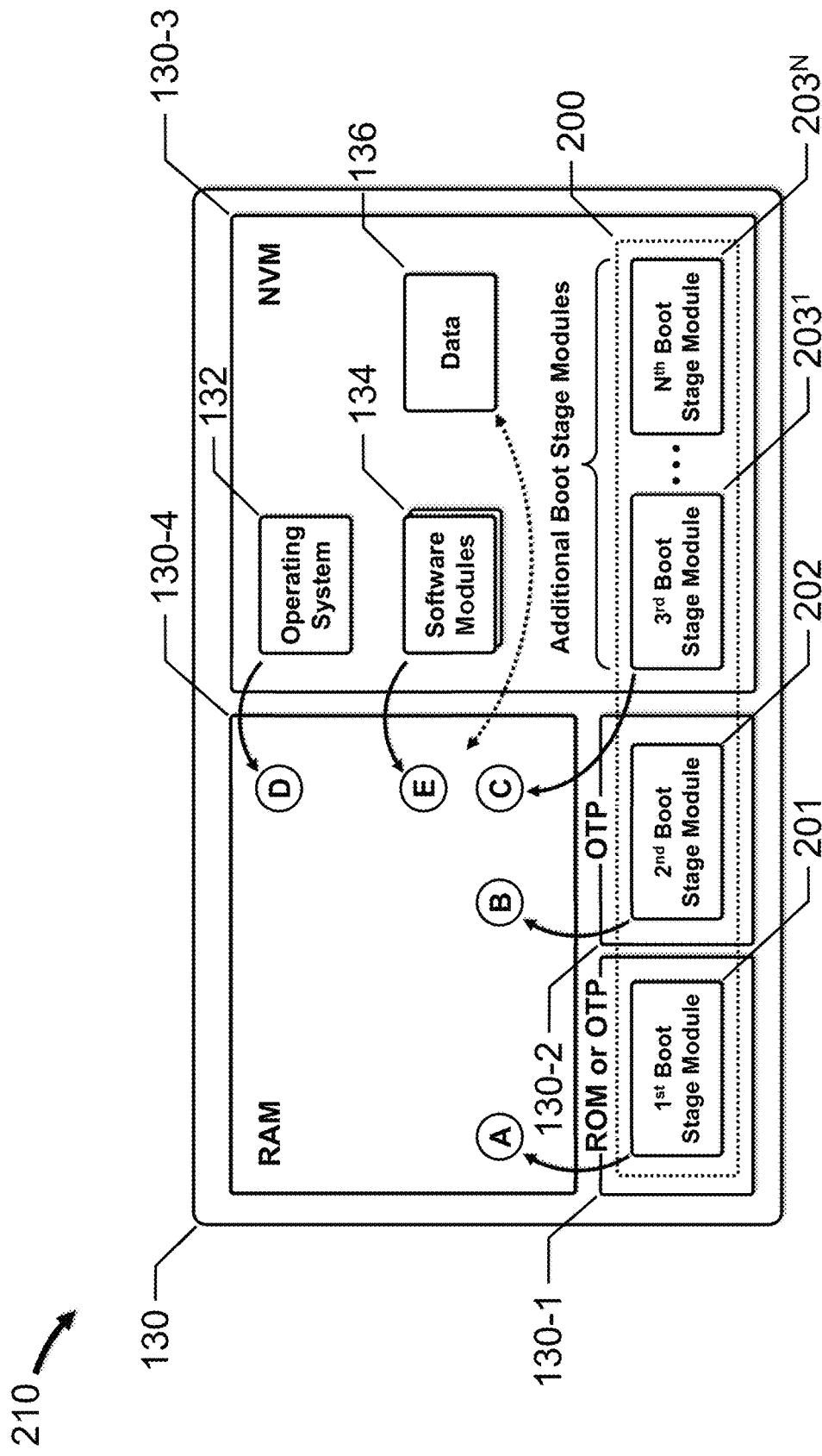
FIG. 2 depicts a block diagram of a memory, in accordance with embodiments of the present disclosure.

FIG. 2 depicts block diagram 210 of memory 130, in accordance with embodiments of the present disclosure.

As discussed above, memory 130 stores various software components, including, inter alia, operating system 132, software modules 134, data 136, multi-stage secure boot integrity verification system 200, etc. In certain embodiments, memory 130 includes several different types of memory, including ROM or OTP memory 130-1, OTP memory 132-2, NVM 130-3 and RAM 130-4. During a cold boot, processor 120 initializes itself, and then executes power-on self-test (POST) firmware to test and initialize various hardware devices, such as memory 130, I/O interfaces 140, display interface 150, communications interface 160, etc. Processor 120 then sequentially loads and executes the boot stage modules of multi-stage secure boot integrity verification system 200 in order to load device drivers, operating system 132, etc., from NVM 130-3 into RAM 130-4 for execution. During a warm boot, the POST firmware execution may be skipped, and the warm boot process begins by sequentially loading and executing the boot stage modules of multi-stage secure boot integrity verification system 200.

More particularly, multi-stage secure boot integrity verification system 200 includes first boot stage module 201, second boot stage module 202 and a number (i.e., N−2) of additional boot stage modules $203^1$, ..., $203^N$. First boot stage module 201 is an immutable program that is stored in a secure portion of memory 130, such as, for example, ROM or OTP memory 130-1. Second boot stage module 202 may be stored in a different portion of memory, such as, for example, OTP memory 130-2, while additional boot stage modules $203^i$ may be stored in NVM 130-3. Generally, first boot stage module 201 authenticates second boot stage module 202 based on a quantum-safe process, such as, for example, verifying a stateful HBS, second boot stage module 202 authenticates the next additional boot stage module, i.e., additional boot stage module $203^1$, additional boot stage module $203^1$ authenticates additional boot stage module $203^2$, and so on. In certain embodiments, additional boot stage module $203^1$ may be normal code.

Initially, a first version of second boot stage module 202 is stored in OTP memory 130-2. In one embodiment, the first version of second boot stage module 202 authenticates additional boot stage module $203^1$ based on a non-quantum-safe process, such as, for example, verifying a digital signature using RSA, digital signature algorithm (DSA), elliptic curve digital signature algorithm (ECDSA), etc. In another embodiment, the first version of second boot stage module 202 authenticates additional boot stage module $203^1$ based on a quantum-safe process, such as, for example, verifying a stateful HBS.

In both embodiments, the first version of second boot stage module 202 is subsequently replaced by a second version of second boot stage module 202 that includes a quantum-safe process, such as, for example, a quantum-resistant public-key cryptographic algorithm approved by the National Institute of Standards and Technology (NIST). The first version of second boot stage module 202 is then disabled, erased, over-written, etc., to prevent loading and execution by processor 120.

The boot process is the same for a cold boot and a warm boot, and may be generally divided into several phases or stages of execution.

During the first stage, processor 120 reads an image of first boot stage module 201 from ROM or OTP memory 130-1 into RAM 130-4, and executes first boot stage module 201, as indicated by reference "A" in FIG. 2. Processor 120 reads an image of a first version of second boot stage module 202 from OTP memory 130-2 into RAM 130-4, first boot stage module 201 authenticates the image of the first version of second boot stage module 202 based on a quantum-safe process, and, when authenticated, processor 120 executes the first version of the second boot stage module 202, as indicated by reference "B" in FIG. 2. In one embodiment, the quantum-safe process includes verifying the stateful HBS within the image of the first version of second boot stage module 202. If the first version of the second boot stage module 202 is not authenticated, execution of first boot stage module 201 is terminated, resulting in a boot failure.

During the second stage, additional boot stage module $203^1$ is authenticated by the first version of second boot stage module 202. During a third stage, additional boot stage module $203^1$ authenticates additional boot stage module $203^2$, and so on. More particularly, for each additional boot stage module $203^{i+1}$, processor 120 reads an image of the additional boot stage module $203^{i+1}$ from NVM 130-3 into RAM 130-4, additional boot stage module $203^i$ authenticates the image of the additional boot stage module $203^{i+1}$ based on a quantum-safe or a non-quantum-safe process, and, when authenticated, processor 120 executes the additional boot stage module $203^{i+1}$, as indicated by reference "C" in FIG. 2. If any one of the additional boot stage modules $202^i$ is not authenticated, execution of second boot stage module 202 is terminated, resulting in a boot failure.

Each additional boot stage module $203^i$ may initialize certain hardware components, load and initialize certain hardware device drivers, load certain software components not depicted in FIG. 2, etc. In one embodiment, the last additional boot stage module $203^N$ loads operating system 132, as indicated by reference "D" in FIG. 2, which then loads the applications within software modules 134, as indicated by reference "E" in FIG. 2. Data 136 are exchanged between RAM 130-4 and NVM 130-3 during execution of operating system 132 and the applications within software modules 134.

The first version of second boot stage module 202 is subsequently replaced by a second version of second boot stage module 202 that includes a quantum-safe process, as described above. In one embodiment, the second version of second boot stage module 202 may be stored in OTP memory 130-2 or NVM 130-3, and OTP memory 130-2 may be written to prevent the reading of the image of the first version of second boot stage module 202.

In a further embodiment, first boot stage module 201 may be configured to authenticate the first and second versions of second boot stage module 202 based on a last stored cryptographic hash, such as, for example, SHA-256. In this embodiment, first boot stage module 201 includes a firmware update module that is configured to update the hash stored in a secure portion of memory 130 based on a one-time signature or an HBS.

Of course, the principles of the present disclosure are advantageously applicable to computer systems that boot remotely rather than from local memory, such as, for example, a computer system that boots from a network server via communications interface 160, etc.

While a stateful HBS may be safe against quantum attacks at this time, only a limited number of signatures may be generated. Advantageously, because first boot stage module 201 authenticates second boot stage module 202 based on a stateful HBS process, and second boot stage module 202 authenticates additional boot stage module $203^i$ using a new quantum-safe process, an unlimited number of updates may be accommodated in the future. Additionally, if the stateful HBSs are generated using HSMs, then the manufacturer (i.e., signer) only needs the HSMs to be operational for a limited time until the new quantum-safe process is installed via the second version of second boot stage module 202. In certain embodiments, each additional boot stage module $203^i$ may be upgraded to incorporate new quantum-safe process, and stored in NVM 130-3. In other embodiments, the latter stages of the boot process may not need high integrity, since access to some resources are already disabled, by the previous stages of the boot, when these stages are executed.

Figure 3:
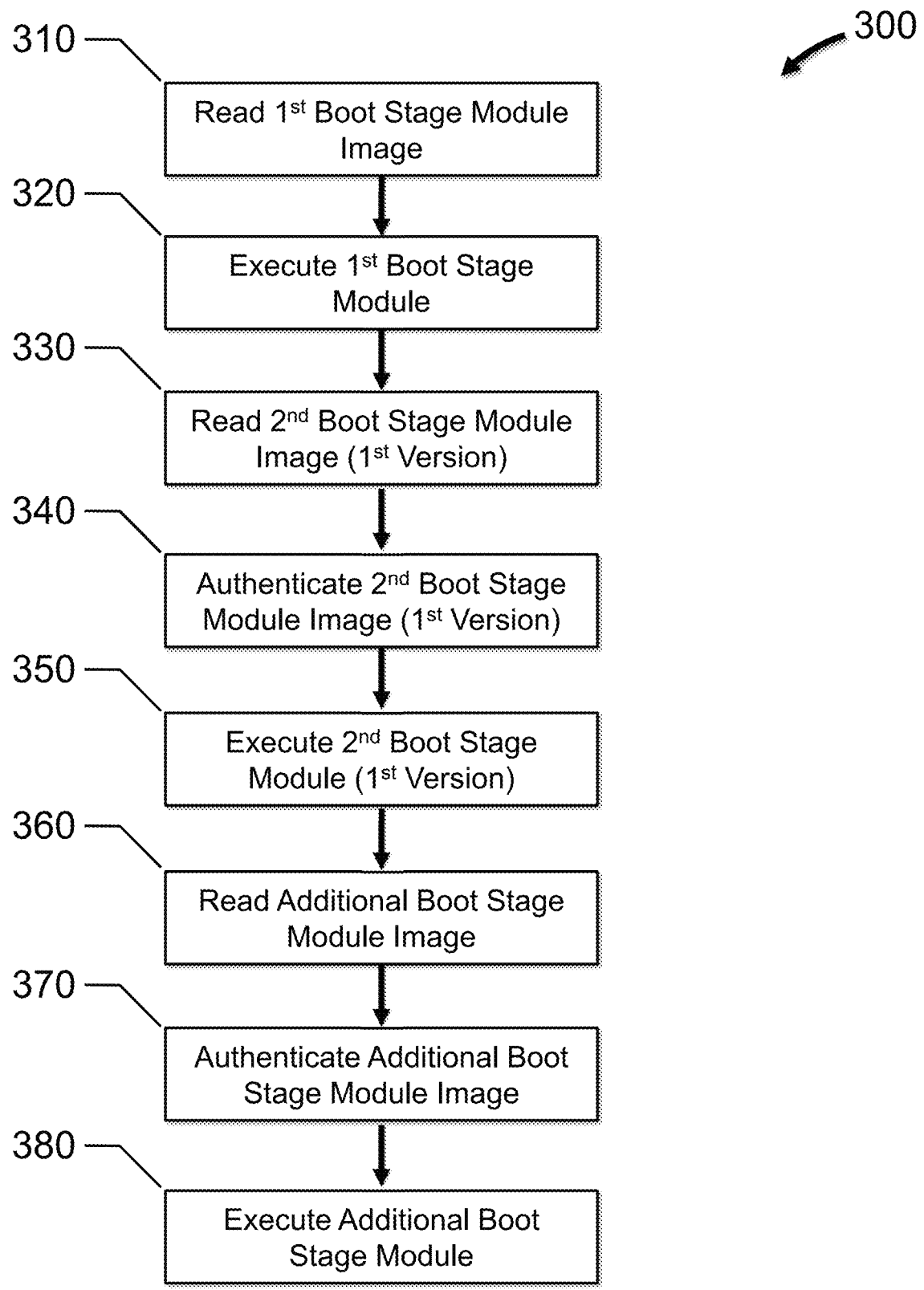
FIG. 3 depicts a flow diagram presenting functionality for a secure booting process for a computer system, in accordance with embodiments of the present disclosure.

FIG. 3 depicts flow diagram 300 presenting functionality for a secure booting process for a computer system, in accordance with embodiments of the present disclosure.

At 310, an image of first boot stage module 201 of multi-stage secure boot integrity verification system 200 is read from ROM or OTP memory 130-1.

At 320, first boot stage module 201 is executed.

At 330, an image of a first version of second boot stage module 202 of multi-stage secure boot integrity verification system 200 is read from OTP memory 130-2. The first version of second boot stage module 202 includes a stateful hash-based signature (HBS).

At 340, the first version of second boot stage module 202 is authenticated, by first boot stage module 201, based on a quantum-safe process that includes verifying the stateful HBS within the image of the first version of second boot stage module 202.

At 350, the first version of second boot stage module 202 is executed when the stateful HBS is verified.

At 360, an image of an additional boot stage module 201' is read from NVM 130-3.

At 370, the image of the additional boot stage module 201' is authenticated by the first version of second boot stage module 202.

At 380, the additional boot stage module 201' is executed when authenticated.

Prior to a subsequent secure booting of the computer system, the first version of second boot stage module 202 is replaced with a second version of second boot stage module 202 that is configured to authenticate the image of each additional boot stage module $201^i$ based on a quantum-safe process.

And, during the subsequent secure booting of the computer system, the second version of second boot stage module 202 is authenticated by first boot stage module 201, and then executed in place of the first version of second boot stage module 202.

The embodiments described herein are combinable.

In one embodiment, a method of assuring integrity of code loaded during a boot process of a computer system includes reading an image of a first boot stage module of a multi-stage secure boot integrity verification system from a first memory; executing the first boot stage module; reading an image of a first version of a second boot stage module of the multi-stage secure boot integrity verification system from a second memory, the first version of the second boot stage module including a stateful hash-based signature (HBS); authenticating, by the first boot stage module, the first version of the second boot stage module based on a quantum-safe process, including verifying the stateful HBS within the image of the first version of the second boot stage module; executing the first version of the second boot stage module when the stateful HBS is verified; reading an image of an additional boot stage module from a third memory; authenticating, by the first version of the second boot stage module, the image of the additional boot stage module; and executing the additional boot stage module when the image of the additional boot stage module is authenticated. Prior to a subsequent secure booting of the computer system, the first version of the second boot stage module is replaced with a second version of the second boot stage module that is configured to authenticate the image of the additional boot stage module based on a quantum-safe process, and, during the subsequent secure booting of the computer system, the second version of the second boot stage module is authenticated by the first boot stage module, and then executed in place of the first version of the second boot stage module.

In another embodiment of the method, the first memory is a read-only memory or a one time programmable (OTP) memory.

In another embodiment of the method, the second memory is an OTP memory, and the replacement of the first version of the second boot stage module includes storing the second version of the second boot stage module in the second memory or the third memory; and writing to a portion of the second memory to prevent the reading of the image of the first version of the second boot stage module.

In another embodiment of the method, the third memory is a non-volatile memory.

In another embodiment of the method, the method further comprises terminating execution of the first boot stage module when the stateful HBS is not verified.

In another embodiment of the method, the method further comprises terminating execution of the second boot stage module when the additional boot stage module is not authenticated.

In another embodiment of the method, prior to the replacement of the first version of the second boot stage module, said authenticating the image of the additional boot stage module is based on a non-quantum-safe process.

In another embodiment of the method, prior to the replacement of the first version of the second boot stage module, said authenticating the image of the additional boot stage module is based on a quantum-safe process.

In another embodiment of the method, the image of the additional boot stage module includes a stateful HBS, and said authenticating the image of the additional boot stage module includes verifying the stateful HBS within the image of the additional boot stage module.

In another embodiment of the method, the first boot stage module is configured to authenticate the first and second versions of the second boot stage module based on a last stored cryptographic hash; and the first boot stage module includes a firmware update module that is configured to update the hash stored in a secure memory based on a one-time signature or an HBS.

In one embodiment, a computer system includes a memory and a processor coupled to the memory. The memory stores a multi-stage secure boot integrity verification system including a first boot stage module, a first version of a second boot stage module and an additional boot stage module. The first version of the second boot stage module includes a stateful hash-based signature (HBS). The memory includes a first memory portion storing the first boot stage module, a second memory portion storing the first version of the second boot stage module, and a third memory portion storing the additional boot stage module. The processor is configured to read an image of the first boot stage module; execute the first boot stage module; read an image of the first version of the second boot stage module; authenticate, by the first boot stage module, the first version of the second boot stage module based on a quantum-safe process, including verify the stateful HBS within the image of the first version of the second boot stage module; execute the first version of the second boot stage module when the stateful HBS is verified; read an image of the additional boot stage module; authenticate, by the first version of the second boot stage module, the image of the additional boot stage module; and execute the additional boot stage module when the image of the additional boot stage module is authenticated. Prior to a subsequent secure booting of the computer system, the first version of the second boot stage module is replaced with a second version of the second boot stage module that is configured to authenticate the image of the additional boot stage module based on a quantum-safe process, and, during the subsequent secure booting of the computer system, the second version of the second boot stage module is authenticated by the first boot stage module, and then executed in place of the first version of the second boot stage module.

In another embodiment of the computer system, the first memory portion is a read only memory.

In another embodiment of the computer system, the second memory portion is a one-time programmable memory, and the replacement of the first version of the second boot stage module includes store the second version of the second boot stage module in the second memory portion or the third memory portion, and write to the second memory portion to prevent the reading of the image of the first version of the second boot stage module.

In another embodiment of the computer system, the third memory portion is a non volatile memory.

In another embodiment of the computer system, the processor is further configured to terminate execution of the first boot stage module when the stateful HBS is not verified.

In another embodiment of the computer system, the processor is further configured to terminate execution of the second boot stage module when the additional boot stage module is not authenticated.

In another embodiment of the computer system, prior to the replacement of the first version of the second boot stage module, said authenticate the image of the additional boot stage module is based on a non-quantum-safe process.

In another embodiment of the computer system, prior to the replacement of the first version of the second boot stage module, said authenticate the image of the additional boot stage module is based on a quantum-safe process.

In another embodiment of the computer system, the image of the additional boot stage module includes a stateful HBS, and said authenticate the image of the additional boot stage module includes verify the stateful HBS within the image of the additional boot stage module.

In another embodiment of the computer system, the first boot stage module is configured to authenticate the first and second versions of the second boot stage module based on a last stored cryptographic hash, and the first boot stage module includes a firmware update module that is configured to update the hash stored in a secure memory based on a one-time signature or an HBS.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A method of assuring integrity of code loaded during a boot process of a computer system, comprising:
   reading an image of a first boot stage module of a multi-stage secure boot integrity verification system from a first memory;
   executing the first boot stage module;
   reading an image of a first version of a second boot stage module of the multi-stage secure boot integrity verification system from a second memory, the first version of the second boot stage module including a stateful hash-based signature (HBS);
   authenticating, by the first boot stage module, the first version of the second boot stage module based on a quantum-safe process, including verifying the stateful HBS within the image of the first version of the second boot stage module;
   executing the first version of the second boot stage module when the stateful HBS is verified;
   reading an image of an additional boot stage module from a third memory;
   authenticating, by the first version of the second boot stage module, the image of the additional boot stage module; and
   executing the additional boot stage module when the image of the additional boot stage module is authenticated,
   where, prior to a subsequent secure booting of the computer system, the first version of the second boot stage module is replaced with a second version of the second boot stage module that is configured to authenticate the image of the additional boot stage module based on a quantum-safe process, and
   where, during the subsequent secure booting of the computer system, the second version of the second boot stage module is authenticated by the first boot stage module, and then executed in place of the first version of the second boot stage module.

2. The method of claim 1, where the first memory is a read-only memory or a one time programmable (OTP) memory.

3. The method of claim 2, where the second memory is an OTP memory, and the replacement of the first version of the second boot stage module includes:
   storing the second version of the second boot stage module in the second memory or the third memory; and
   writing to a portion of the second memory to prevent the reading of the image of the first version of the second boot stage module.

4. The method of claim 3, where the third memory is a non-volatile memory.

5. The method of claim 1, further comprising terminating execution of the first boot stage module when the stateful HBS is not verified.

6. The method of claim 1, further comprising terminating execution of the second boot stage module when the additional boot stage module is not authenticated.

7. The method of claim 1, where, prior to the replacement of the first version of the second boot stage module, said authenticating the image of the additional boot stage module is based on a non-quantum-safe process.

8. The method of claim 1, where, prior to the replacement of the first version of the second boot stage module, said authenticating the image of the additional boot stage module is based on a quantum-safe process.

9. The method of claim 8, where the image of the additional boot stage module includes a stateful HBS, and said authenticating the image of the additional boot stage module includes verifying the stateful HBS within the image of the additional boot stage module.

10. The method of claim 1, where:
   the first boot stage module is configured to authenticate the first and second versions of the second boot stage module based on a last stored cryptographic hash; and
   the first boot stage module includes a firmware update module that is configured to update the hash stored in a secure memory based on a one-time signature or an HBS.

11. A computer system, comprising:
   a memory storing a multi-stage secure boot integrity verification system including a first boot stage module, a first version of a second boot stage module and one or more additional boot stage modules, the first version of the second boot stage module including a stateful hash-based signature (HBS), the memory including:
      a first memory portion storing the first boot stage module,
      a second memory portion storing the first version of the second boot stage module, and
      a third memory portion storing an additional boot stage module; and a processor, coupled to the memory, configured to:
  read an image of the first boot stage module,
  execute the first boot stage module,
  read an image of the first version of the second boot stage module,
  authenticate, by the first boot stage module, the first version of the second boot stage module based on a quantum-safe process, including verify the stateful HBS within the image of the first version of the second boot stage module,
  execute the first version of the second boot stage module when the stateful HBS is verified,
  read an image of the additional boot stage module,
  authenticate, by the first version of the second boot stage module, the image of the additional boot stage module, and
  execute the additional boot stage module when the image of the additional boot stage module is authenticated,
  where, prior to a subsequent secure booting of the computer system, the first version of the second boot stage module is replaced with a second version of the second boot stage module that is configured to authenticate the image of the additional boot stage module based on a quantum-safe process, and
  where, during the subsequent secure booting of the computer system, the second version of the second boot stage module is authenticated by the first boot stage module, and then executed in place of the first version of the second boot stage module.

12. The computer system of claim 11, where the first memory portion is a read-only memory.

13. The computer system of claim 12, where the second memory portion is a one-time programmable memory, and the replacement of the first version of the second boot stage module includes:
  store the second version of the second boot stage module in the second memory portion or the third memory portion; and
  write to the second memory portion to prevent the reading of the image of the first version of the second boot stage module.

14. The computer system of claim 13, where the third memory portion is a non-volatile memory.

15. The computer system of claim 11, where the processor is further configured to terminate execution of the first boot stage module when the stateful HBS is not verified.

16. The computer system of claim 11, the processor is further configured to terminate execution of the second boot stage module when the additional boot stage module is not authenticated.

17. The computer system of claim 11, where, prior to the replacement of the first version of the second boot stage module, said authenticate the image of the additional boot stage module is based on a non-quantum-safe process.

18. The computer system of claim 11, where, prior to the replacement of the first version of the second boot stage module, said authenticate the image of the additional boot stage module is based on a quantum-safe process.

19. The computer system of claim 18, where the image of the additional boot stage module includes a stateful HBS, and said authenticate the image of the additional boot stage module includes verify the stateful HBS within the image of the additional boot stage module.

20. The computer system of claim 11, where:
  the first boot stage module is configured to authenticate the first and second versions of the second boot stage module based on a last stored cryptographic hash; and
  the first boot stage module includes a firmware update module that is configured to update the hash stored in a secure memory based on a one-time signature or an HBS.

* * * * *